No. 696,167. Patented Mar. 25, 1902.
B. FORESTER.
CAMERA TRIPOD.
(Application filed Oct. 26, 1901.)
(No Model.)
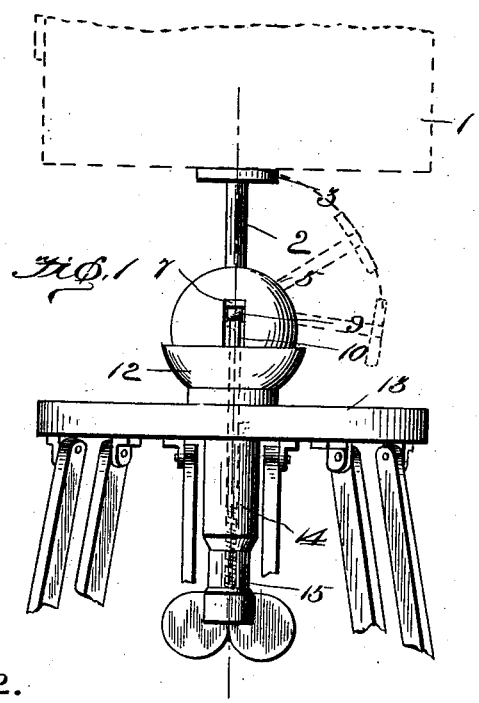
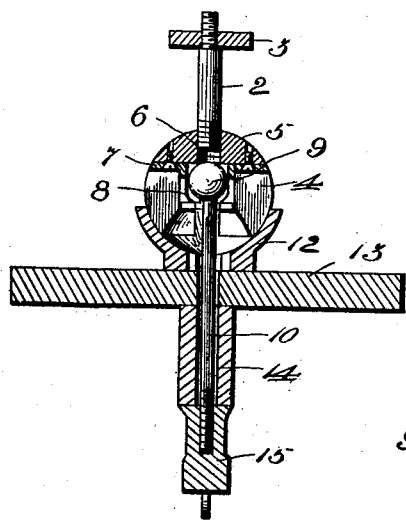
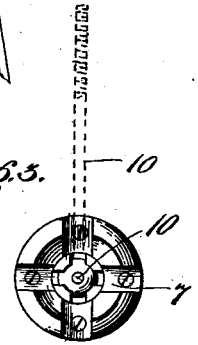
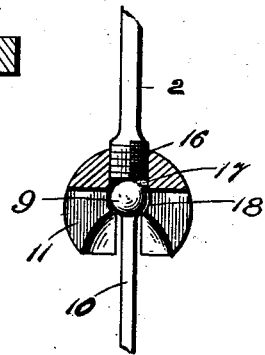
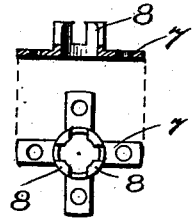
Witnesses
Bernard M. Offutt
A. S. Carnell
Berton Forester, Inventor
by H. L. C. O'Brien
Attorney
THE NORRIS PETERS CO., PHOTO-LITHO., WASHINGTON, D. C.

UNITED STATES PATENT OFFICE.

BERTON FORESTER, OF ST. LOUIS, MISSOURI, ASSIGNOR OF ONE-HALF TO HENRY D. O'BRIEN, OF ST. LOUIS, MISSOURI.

CAMERA-TRIPOD.

SPECIFICATION forming part of Letters Patent No. 696,167, dated March 25, 1902.

Application filed October 26, 1901. Serial No. 80,073. (No model.)

*To all whom it may concern:*

Be it known that I, BERTON FORESTER, a citizen of the United States, residing at 4539 Rutger street, in the city of St. Louis, in the State of Missouri, have invented certain new and useful Improvements in Camera-Tripods; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in camera-tripods; and the main object of my invention is the provision of a device carried by the tripod which will allow the camera to be placed and be held at any desired angle or incline while an exposure is being made.

Another object of my invention is the provision of an attachment for tripods which is very easily adjusted and very positive in its action after adjusted.

Another object of my invention is the provision of a tripod attachment embodying novel features of construction and combination of parts substantially as disclosed herein.

In the drawings, Figure 1 is a side elevation of the upper portion of a tripod with my attachment in use thereon. Fig. 2 is a vertical central sectional view of the attachment. Fig. 3 is a bottom plan view of the ball and its socket. Fig. 4 is a detail view of the detachable socket, and Fig. 5 is a sectional view of a modified form of the ball.

Referring to the drawings, the numeral 1 designates a camera casing or box, which in this instance is shown in dotted lines, and connected to the box is the threaded stem 2, carrying the plate 3 to give a more perfect base for the camera. Connected to the lower end of this stem is the sphere or ball 4, which is provided with the upper portion 5, in which the stem 2 fits by being screwed into the opening 6. Secured interiorly of the ball or sphere is a plate 7, having the central socket 8, in which is adapted to fit the small ball 9 of the long stem 10. The ball is formed so as to have four slots or guiding-spaces 11, in which the stem 10 is adapted to pass as the sphere is adjusted in the socket-piece or cup 12 to secure any incline for the camera.

Adapted to surround the stem 10 and have the base of the socket 12 fit thereon is the tripod platform or cap 13, to which the legs are secured, and surrounding the stem 10 below this platform is a sleeve 14, which allows the threaded end of the stem 10 to protrude, so that the thumb-nut or cap 15 engages it and draws the ball 9 into its socket, so as to bind the sphere, the socket 12, platform 13, and sleeve 14 thus holding the sphere at any adjustment.

In Fig. 5 I have shown a modified form, in which I dispense with the plate 7, providing the enlarged end upon the stem 2, which fits in the opening 17, which is large enough to allow the stem 10 and its ball 9 to slide therethrough, so that the ball 9 engages the circumference of the small socket 18, formed at the base of the opening 17 and the top of the guiding-spaces 11.

From the foregoing description, taken in connection with the drawings, it is evident that I provide a tripod attachment which is easily and quickly operated to adjust and secure the camera at any desired incline and that by the manipulation of a single thumbscrew the parts are securely bound together or released, thus producing a very simple yet thoroughly efficient and practical tripod.

What I claim as new is—

1. A tripod attachment consisting of a ball or sphere provided with an interior socket and a series of radiating slots, a socket-piece in which said sphere fits, and means mounted in said sphere and passing through the socket for binding the sphere in the socket.

2. A tripod attachment, comprising a ball or sphere having an interior socket and radiating slots, means for carrying a camera carried by said ball, a socket-piece in which said ball fits adjustably, and means mounted in said ball's interior socket and passing through the socket-piece for binding the ball in the socket-piece.

3. A tripod attachment comprising a ball or sphere having an interior socket and a series of slots radiating from said socket, means for securing a camera thereto carried by the ball, a socket-piece in which adjustably fits said ball, a stem provided with a ball which fits in the socket of the first-mentioned ball and has its stem passing through the socket-piece, and means for engaging said stem to cause its ball to bind the main ball and socket-piece together.

4. A tripod attachment, comprising a ball or sphere having an interior socket and a series of slots radiating from said socket, means for securing a camera thereto carried by the sphere, a socket-piece in which adjustably fits said sphere, a stem provided with a ball which fits in the socket of the sphere and has its stem passing through the socket-piece, a tripod-platform surrounding said stem below the socket-piece, and means engaging said stem to bind the parts together.

5. A tripod attachment for cameras, comprising a ball or sphere, a spherical socket interiorly of said ball or sphere, a series of slots or guiding-spaces in said ball leading radially from said socket, a cup in which said ball rests, a stem passing through the cup and entering the ball so as to fit in its center and be guided by one of the slots, a ball or sphere carried upon the upper end of the stem and fitting in the socket of the main ball, and means carried upon the stem for clamping and holding the parts together.

6. A tripod attachment for cameras, comprising a ball or sphere, a spherical socket interiorly of said ball or sphere, a series of slots or guiding-spaces in said ball, and leading radially from said socket, a cup in which said ball rests, a stem carrying a small sphere upon its upper end passing through the cup and having its sphere rotatably mounted in the socket of the ball, a tripod-platform surrounding the stem and having the cup resting thereon, and means upon the stem for clamping and holding the parts together.

7. A tripod attachment for cameras, comprising a ball or sphere, a spherical socket interiorly of said ball or sphere, a series of slots or guiding-spaces in said ball, and leading radially from said socket, a cup in which said ball rests, a stem carrying a small sphere upon its upper end passing through the cup and having its sphere rotatably mounted in the socket of the ball, a tripod-platform surrounding the stem and having the cup resting thereon, a sleeve mounted upon the stem below the platform, and a thumb-screw upon the stem below the sleeve for clamping and holding the parts together.

In testimony whereof I affix my signature in presence of two witnesses.

BERTON FORESTER.

Witnesses:
ANNA SCHOEFF,
IGNATIA WIEGREFFE.